(No Model.) 7 Sheets—Sheet 2.
A. B. GLOVER.
WIRE NAIL MACHINE.
No. 383,878. Patented June 5, 1888.
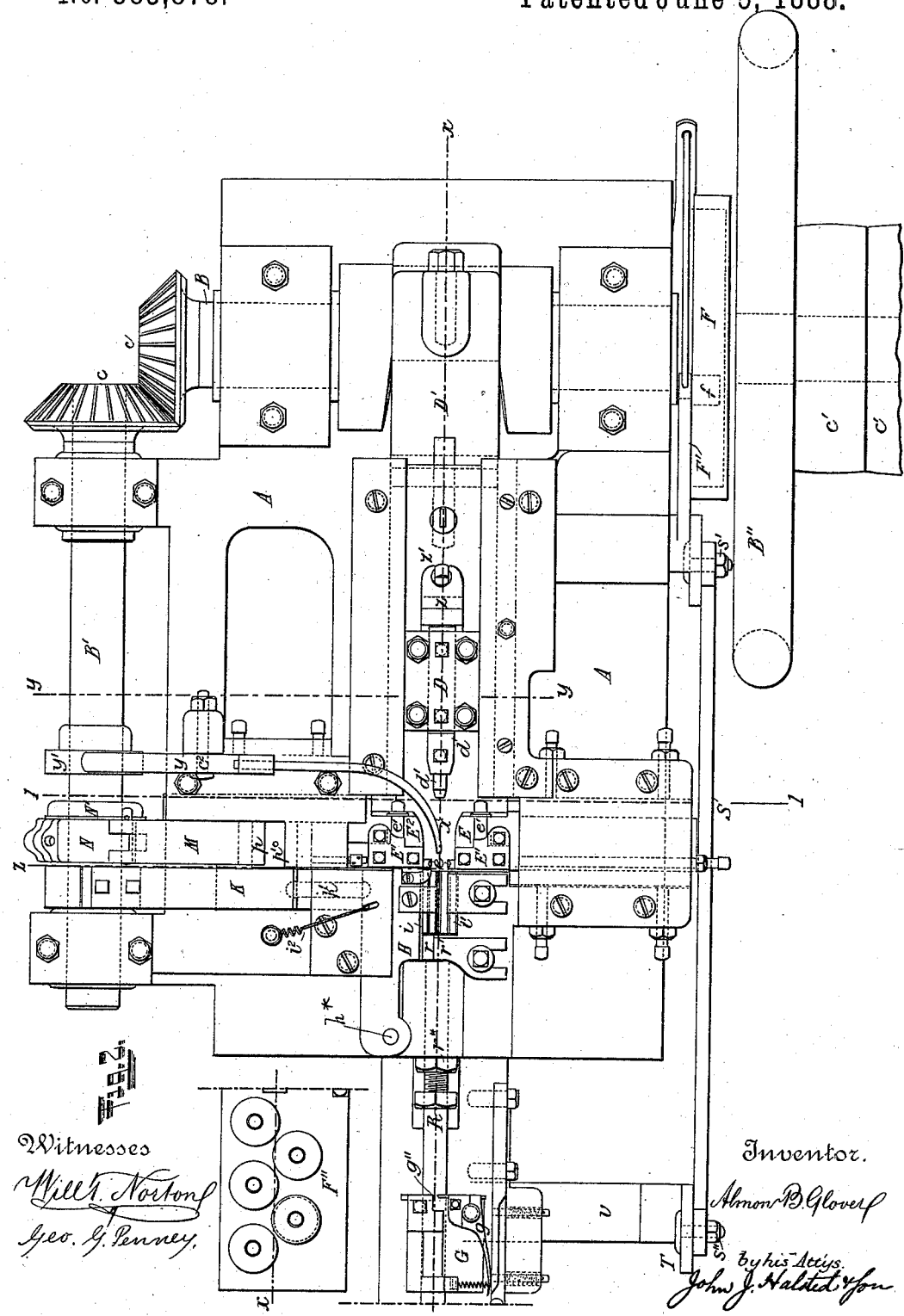
Witnesses
Will T. Norton
Geo. G. Penney
Inventor.
Almon B. Glover
by his Attys.
John J. Halsted & Son

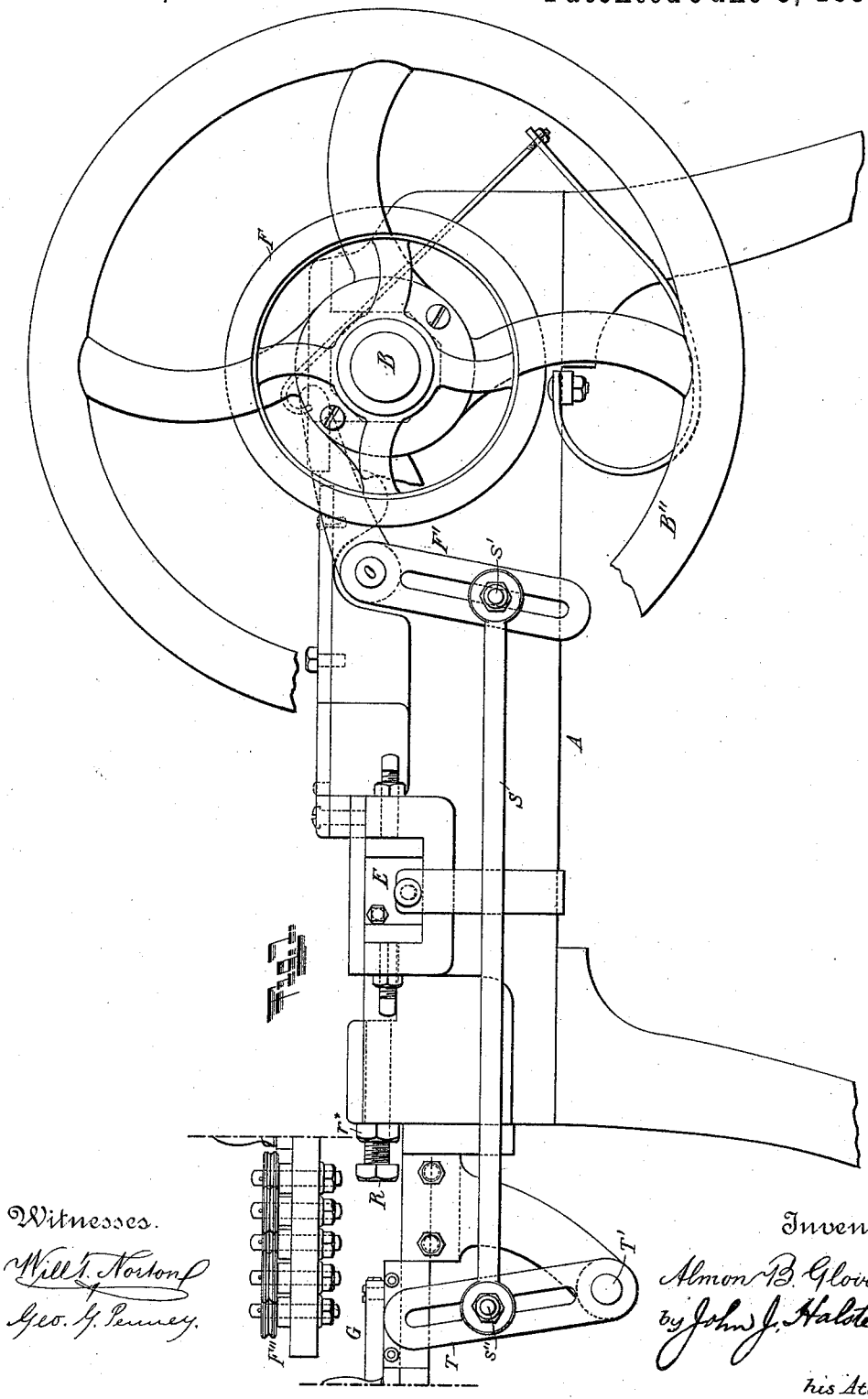

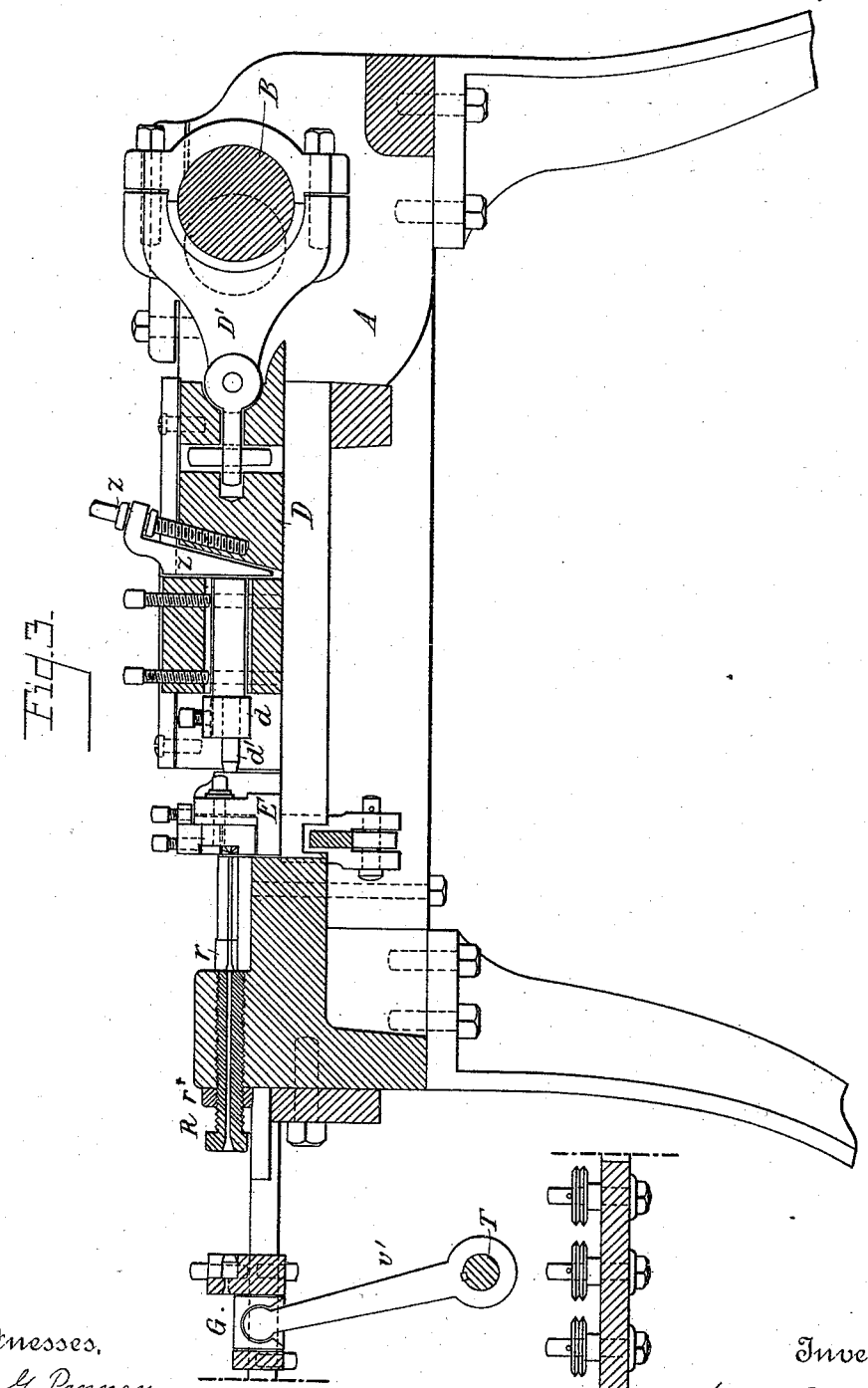

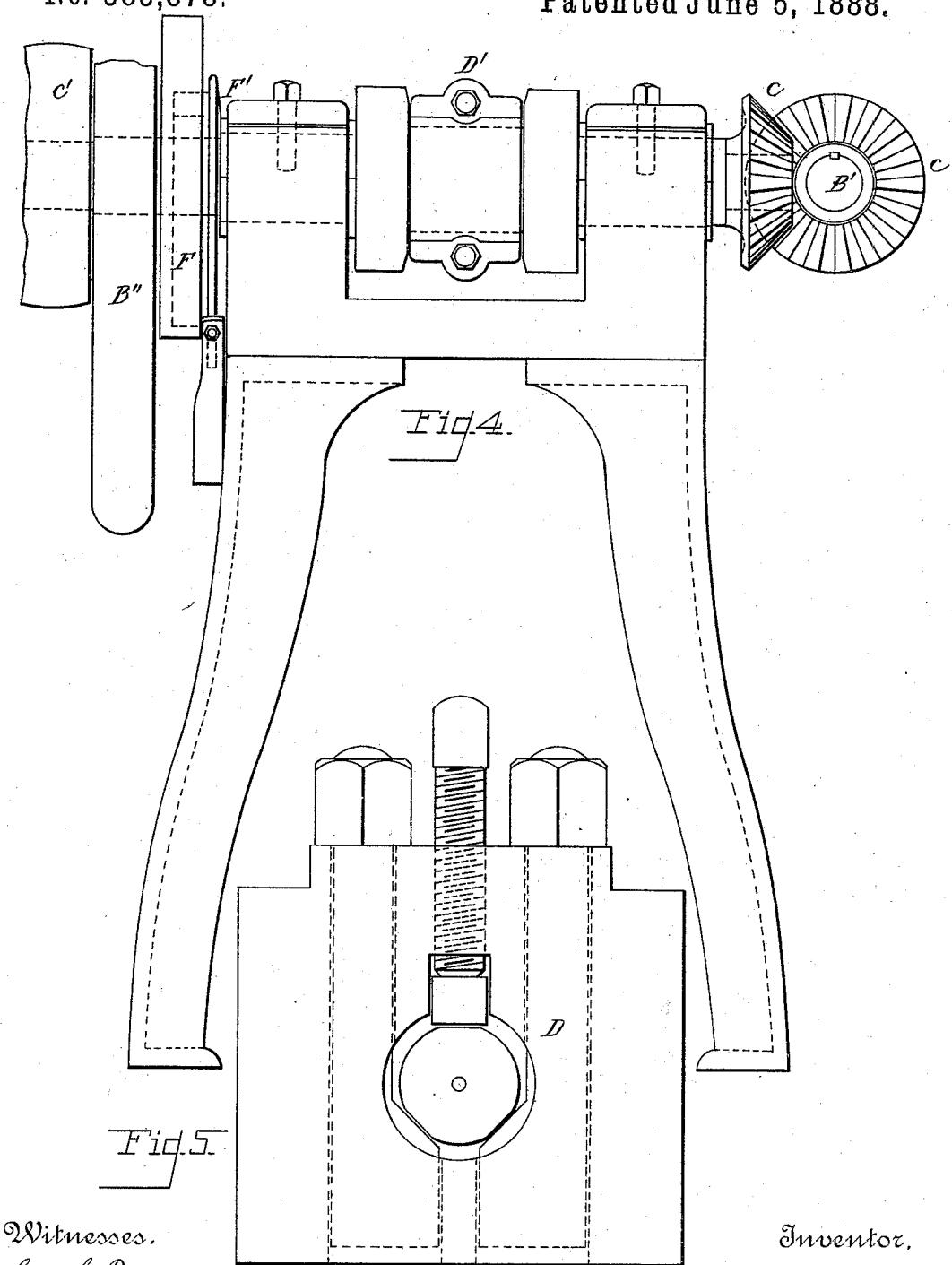

(No Model.) 7 Sheets—Sheet 5.
A. B. GLOVER.
WIRE NAIL MACHINE.

No. 383,878. Patented June 5, 1888.

Witnesses,
Geo. G. Penney,
Will T. Norton

Inventor,
Almon B. Glover
By his Attorneys John J. Halsted (No Model.) 7 Sheets—Sheet 6.
A. B. GLOVER.
WIRE NAIL MACHINE.
No. 383,878. Patented June 5, 1888.
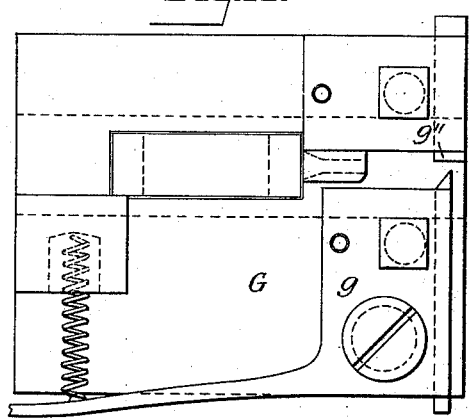
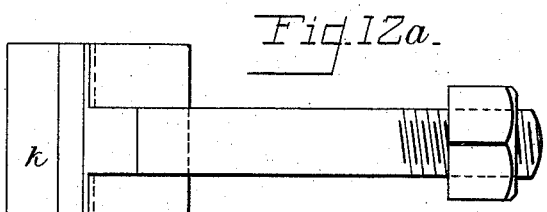
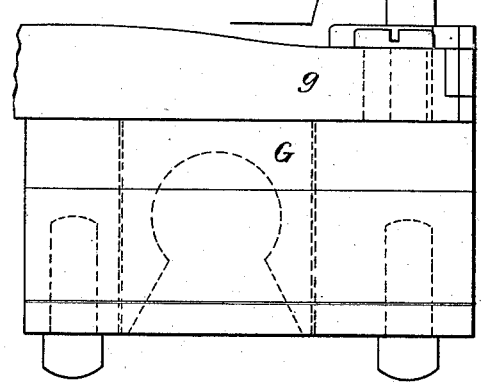
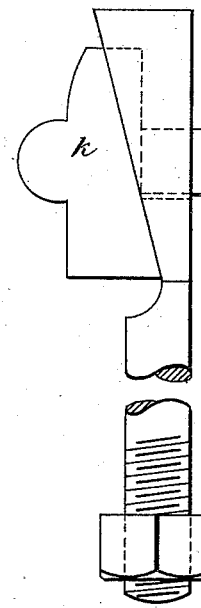
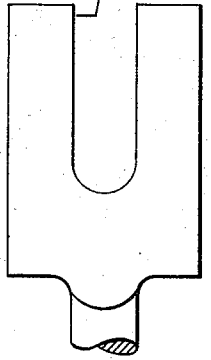
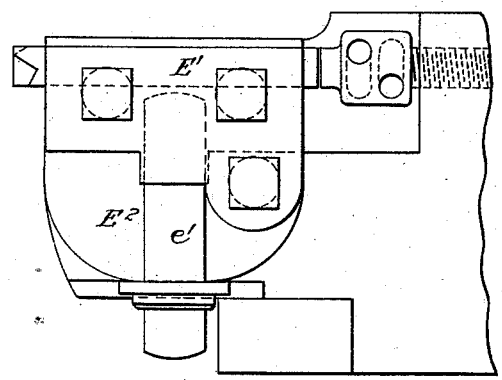
Witnesses.
Geo. G. Penney.
Will T. Norton
Inventor.
Almon B. Glover
By his Attorneys John J. Halsted Son
N. PETERS, Photo-Lithographer, Washington, D.C.

(No Model.) 7 Sheets—Sheet 7.
A. B. GLOVER.
WIRE NAIL MACHINE.
No. 383,878. Patented June 5, 1888.
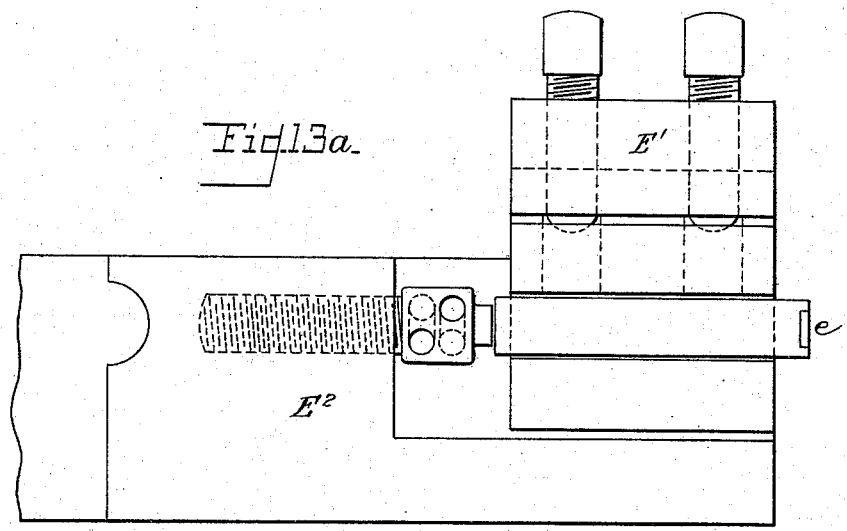
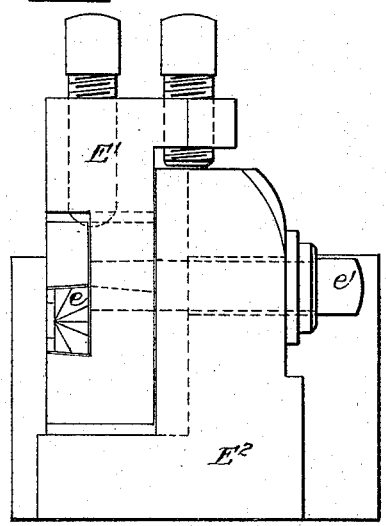
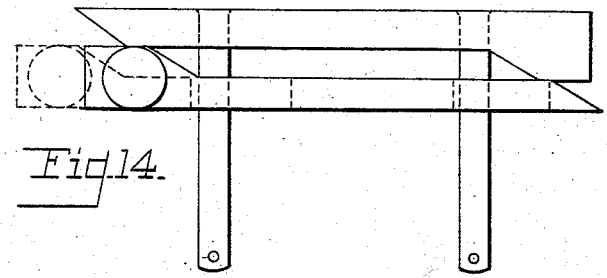
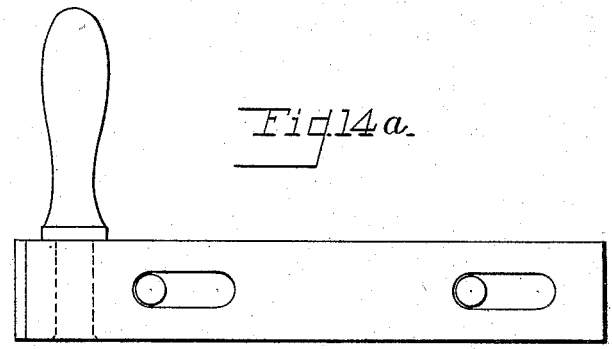
Witnesses.
Geo. G. Penney.
Will T. Norton
Inventor.
Almon B. Glover.
By his Attorneys John J. Halsted

UNITED STATES PATENT OFFICE.

ALMON B. GLOVER, OF BIRMINGHAM, CONNECTICUT.

WIRE-NAIL MACHINE.

SPECIFICATION forming part of Letters Patent No. 383,878, dated June 5, 1888.

Application filed January 9, 1888. Serial No. 260,194. (No model.)

*To all whom it may concern:*

Be it known that I, ALMON B. GLOVER, of Birmingham, in the county of New Haven and State of Connecticut, have invented certain new and useful Improvements in Machines for Making Wire Nails; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The leading features of my invention relate to the devices for gripping the wire and holding it while the head is being formed, to the means for properly actuating and releasing the gripping and holding dies, to the means for adjusting the position of the gripping-dies relatively to the cutting-off dies for varying and regulating the amount of stock or material in the head of the nail, to the devices for cutting off and pointing the nail at the same stroke and leaving the end of the wire in proper condition to be upset to form the head of another nail, to the die-holders which hold the pointing-dies and their relation to adjacent parts, and to certain details and particulars hereinafter set forth.

Figure 6:
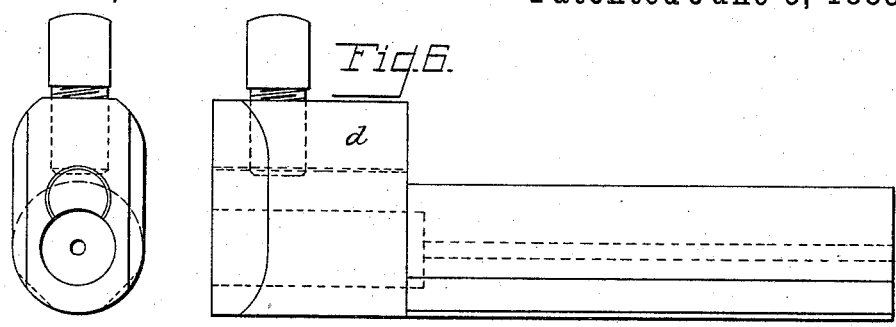
Figure 7:
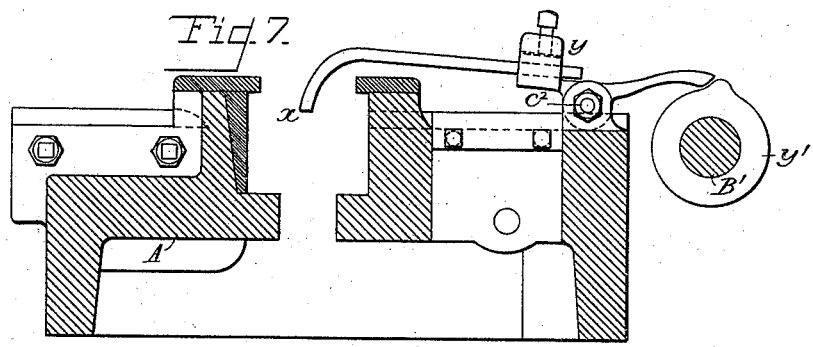
Figure 8:
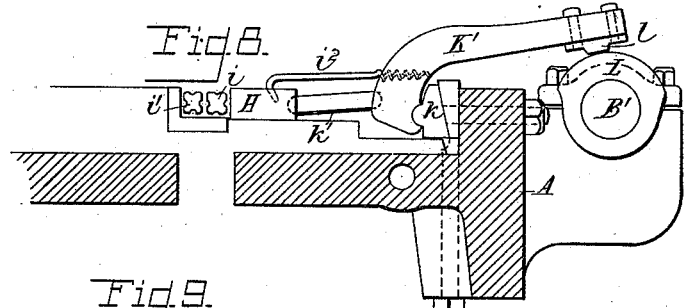
Figure 9:
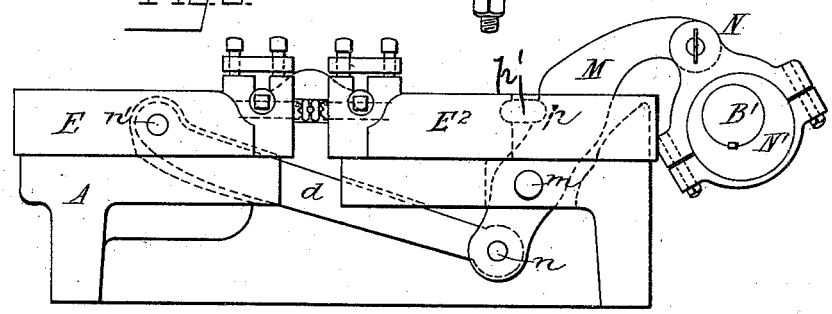

In the drawings, Figure 1 is a side elevation of a machine embodying my improvements; Fig. 2, a plan; Fig. 3, a vertical longitudinal section in the line $x\ x$ of Fig. 2; Fig. 4, a rear end elevation; Fig. 5, a front end view, enlarged, of the heading-slide. Figs. 6 and $6^a$ are respectively side and end elevations, enlarged, of the heading-tool stock; Fig. 7, a partial section in line $y\ y$ of Fig. 2; Fig. 8, a partial section at $z$, Fig. 2; Fig. 9, a section in line 1 1 of Fig. 2. Figs. 10 and 11 are respectively top and side views, enlarged, of the feeding-slide. Figs. 12, $12^a$, and $12^b$ are enlarged views of the device for controlling the gripping-dies. Figs. 13, $13^a$, and $13^b$ are respectively plan, side, and end views of the inner end of one of the transverse pointing-slides, enlarged. Figs. 14 and $14^a$ show respectively plan and side views, enlarged, of the device for controlling the feeding of the wire.

The same letters indicate like parts in all the drawings.

A is the bed or frame of the machine; B, the main shaft, upon which are pulleys $c'\ c'$, by which the machine is driven.

B'' is the balance-wheel.

F is a disk having in its inner face an irregular cam-groove for operating the feeding device.

B' is a side shaft at right angles to the shaft B, and from which it receives its motion through the miter-gear $c\ c$.

D, Figs. 2 and 3, is a slide secured in suitable ways or guides in the bed of the machine. This slide is connected by a pitman, D', to a crank on the main shaft B. In the front end of this slide is secured the heading-die $d'$ in the die-holder $d$.

$z$, Figs. 2 and 3, is a wedge behind the die-holder $d$, and against which the die-holder abuts. Said wedge is raised and lowered by screw $z'$, and by which the heading-die $d'$ is adjusted longitudinally.

E $E^2$, Figs. 1, 2, 3, and 9, are a pair of transverse slides. To the inner end of these slides are secured the dies for cutting off and pointing the nail. Said dies and die-holders, with the end of the slide, (illustrating the manner of their attachment thereto,) are shown in full size in three views, Figs. 13, $13^a$, and $13^b$, of which 13 is a plan, $13^a$ a side, and $13^b$ an end view.

E' is the die-holder, within which the pointing-dies $e\ e$ are secured, said die-holders being removably secured to the slides E $E^2$ by screws $e'\ e'$, so that they may be easily removed for the purpose of changing or repairs.

The pointing-dies $e\ e$ have their cutting ends adapted to cut off and point the nail at the same stroke, leaving the end of the wire in suitable condition to be upset to form the head of another nail.

M, Figs. 2 and 9, is a lever passing down through a mortise in the bed of the machine and having a fulcrum at $m$. The upper or outer end of said lever is connected by a pitman, N, to an eccentric, N', on shaft B'. The lower end of said lever is connected at $n$ to one end of a connecting-rod, $d$, Fig. 9. Said rod from its connection with M at $n$ passes across on the under side of the machine, and, inclining upward through a portion of the bed of the machine, it enters a mortise (shown in dotted lines in Fig. 9) in the under side of the slide E, and to which it is secured by pin $n'$. At the point $p$ the lever M is connected to slide $E^2$ by a short toggle, $p'$, Fig. 2, and shown in dotted lines in Fig. 9. The point $p$ of the toggle-connection and the point $n$ of the connecting-rod are each the same distance from the fulcrum-pin $m$ of the lever M, so that when motion is given to the outer end of said lever by eccentric $N'$ the slides E and $E^2$ travel in unison each the same distance, thus bringing the pointing-dies $e\ e$ together in the center to cut off and point the nail.

Referring now to Figs. 2 and 7, $y$ is a lever having its fulcrum on the bolt at $c^u$. The outer end of this lever rests upon a cam, $y'$, on shaft B' and is operated thereby. A bent finger, $x$, called a "clearer," is secured by a set-screw in the inner end of the lever. Said finger is, as shown, bent to such shape and brought to such position in relation to the pointing-dies that when these pointing-dies have cut off a nail the rise of the cam $y'$ gives the finger $x$ a quick downward movement, thereby knocking the nail out of the way should it fail from any cause to fall soon enough to be out of the way of the advancing heading-die $d'$. Any suitable reacting spring may be employed to raise the clearer as soon as the throw of the cam passes the end of lever $y$.

In Figs. 2, 3, 8, and 9 are shown a pair of gripping-dies, $i\ i'$. Said dies are grooved on each of their four sides to half the size of the wire from which the nail is to be made, so that when the two dies and their adjacent half-grooves are brought together they grip the wire, holding it firmly while the heading-die $d'$ upsets the projecting end of the wire and forms the head of another nail.

H, Figs. 2 and 8, is a gripping-jaw. The inner end of this jaw lies parallel to the moving gripping-die $i$.

K' is a lever having a fulcrum at $k$, Fig. 8. The outer end of said lever rests upon the cam L on shaft B' and is operated thereby.

$k'$ is a toggle-connection between the lever K' and jaw H, placed as shown, so that when the outer end of said lever is raised by cam L the jaw H, which is pivoted at $h^*$, is forced against the gripping-die $i$ to grip the wire.

$i^2$ is a spring attached at one end to the jaw H and at the other end to a fixed stud. The office or duty of said spring is to pull back the jaw H when the lever K falls back upon the lower part of cam L, thereby opening the gripping-dies $i\ i'$ and releasing their grip upon the wire, leaving it free to be fed forward into the machine at the proper time.

R, Figs. 1, 2, and 3, is a stout screw passing through the frame of the machine.

$r$, Figs. 2 and 3, is a block of steel secured in the bed of the machine by clamp $r'$, Fig. 2, between the screw R and dies $i\ i'$. Against said block the dies $i\ i'$ abut, the block resting against the inner end of screw R. Said block and screw are both drilled through their centers (see Fig. 3) on the line of the grooves in the gripping-dies $i\ i'$ for the passage of the wire to said dies.

By running or adjusting the screw R in or out, the inner ends of the dies $i\ i'$ may be adjusted any desired distance from the cutting-off dies $e\ e$, so as to regulate the amount of stock in the head of the nail.

$r^*$ is an adjustable locking-nut on screw R, assisting to hold it firmly to its adjusted position.

I would here remark that the block $r$ is not a positive necessity in this arrangement; but as a general thing I prefer to use it in the machine, as it is of value when the dies shorten by use. The dies and screw may be used as shown in Fig. 2, the dies resting against the screw.

F'', Figs. 1, 2, and 3, is a wire-straightener of common construction.

G is a feeding-slide in the bed of the straightener. Figs. 10 and 11 are plan and side views, full size, of said slide. A gripping-jaw, $g$, is pivoted at $g'$ on slide G in such a manner that when the slide is moved toward the screw R it bites the wire against a fixed jaw, $g''$, and carries it or pushes it through said screw, block $r$, and gripping-dies $i\ i'$; but when the slide G moves in the opposite direction the jaw $g$ has no hold upon the wire.

F', Figs. 1 and 2, is a bent arm pivoted on pin $o$, Fig. 1, in the frame of the machine. The upper end of said arm has a projection on one side, which enters the cam-groove in disk F. (See dotted lines $f$ in Fig. 2.)

S, Figs. 1 and 2, is a connecting-rod, secured to arm F' by a bolt, $s'$, at one end, (so as to turn freely upon it,) and secured in the same manner to arm T at the other end by a bolt, $s''$. The arms T and F' are slotted to receive the bolts $s'$ and $s''$, and to allow of the adjustment of the connecting-rod up or down in order to adjust the length of the stroke, as may be desired.

The arm T is secured upon one end of a rock-shaft, T', Fig. 1. Said shaft passes through a fixed bearing, $v$, Fig. 2, and has upon its inner end an arm, $v'$, Fig. 3. Said arm passes upward into a mortise in the feeding-slide G. By means of this arm $v'$, rock-shaft T', arm T, connecting-rod S, arm F', and grooved cam F, the feeding-slide G is given a vibratory motion to feed the wire intermittently to the machine.

The operation of the machine is as follows: The end of the coil of wire, which may be delivered from a reel convenient to the machine, is passed through the straightener, the feeding-slide, and the tubular screw R to the dies $i\ i'$. The machine being set in motion, the feeding-slide G, from its connection with cam-groove in disk F, as described, feeds the wire into the machine. As soon as the feed stops, the gripping-dies $i\ i'$ (from connection with cam L, as described) close upon the wire, gripping it firmly. Almost simultaneously the pointing-dies $e\ e$ (through their connection with eccentric N', as described) close upon the wire, cutting it off, leaving enough projecting in front of dies $i\ i'$ to form the head of a nail. The dies $e\ e$ then at once recede out of the way of the now-advancing heading-die $d'$, which upsets the projecting end of the wire, forming the head of a nail. As soon as the heading-die commences to recede, the gripping-dies $i\ i'$ release their grip upon the wire. The feeding-slide again feeds in the wire, so that the headed nail follows the receding heading-die for the length of a nail. The gripping-dies close upon the wire again. The pointing-dies $e\ e$ come together, thus cutting off and pointing a piece having on it this upset end, leaving it a finished nail. As soon as the pointing-dies open sufficiently to release their grip upon the nail, the clearer $x$, through its connection with cam $y'$, as described, gives a quick downward stroke, knocking the nail out of the way, should it from any cause fail to get out of the way of the heading-die $d'$, which has now commenced advancing to upset the head of another nail. All these movements are repeated continuously.

Among the advantages sought and attained by my improvements may be named the following, to wit: the production of a wire-nail machine capable of running at a much greater speed than is usually attainable, and one that will run more accurately and be more durable, thus enabling me to turn out more and better work in a given time.

I claim—

1. The spring reacting jaw H, pivoted at $h^*$, in combination with the dies $i\ i'$, for gripping and holding the wire while the head is being formed and for releasing it, as and for the purposes described.

2. The dies $i\ i'$, in combination with jaw H, toggle $k'$, lever K', and cam L, the combination being and operating substantially as and for the purpose described.

3. The block $r$, in combination with dies $i\ i'$ and screw R, these parts being and operating substantially as and for the purpose described.

4. In combination, the pitman N, eccentric N', lever M, rod $d$, toggle $p'$, and slides E E$^2$, the bearing-point $p$ of the toggle and the connecting-point $n$ of the lever being equidistant from its fulcrum $m$.

5. The lever M, in combination with connecting-rod $d$, slides E and E$^2$, and toggle $p$, these parts being constructed and operating in the manner and for the purposes described.

ALMON B. GLOVER.

Witnesses:
  THOS. S. BIRDSEYE,
  HENRY S. BIRDSEYE.